US009779112B2

(12) United States Patent
Gaebler et al.

(10) Patent No.: US 9,779,112 B2
(45) Date of Patent: Oct. 3, 2017

(54) METHOD AND APPARATUS FOR PROVIDING LIST-BASED EXPLORATION OF MAPPING DATA

(75) Inventors: Frank Gaebler, Berlin (DE); Thomas Mann, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 1680 days.

(21) Appl. No.: 13/230,002

(22) Filed: Sep. 12, 2011

(65) Prior Publication Data
US 2013/0063488 A1 Mar. 14, 2013

(51) Int. Cl.
G06F 17/30 (2006.01)
G01C 21/36 (2006.01)
G06F 3/0482 (2013.01)

(52) U.S. Cl.
CPC ... *G06F 17/30241* (2013.01); *G01C 21/3679* (2013.01); *G06F 17/3087* (2013.01); *G06F 17/30905* (2013.01); *G01C 21/3644* (2013.01); *G06F 3/0482* (2013.01); *G09G 2340/12* (2013.01)

(58) Field of Classification Search
None
See application file for complete search history.

(56) References Cited

U.S. PATENT DOCUMENTS

| 6,339,747 | B1 * | 1/2002 | Daly et al. ............. 702/3 |
| 6,970,871 | B1 | 11/2005 | Rayburn |
| 7,783,306 | B2 | 8/2010 | Wilson et al. |
| 2006/0217091 | A1 * | 9/2006 | Tsukio et al. .......... 455/130 |
| 2009/0088964 | A1 | 4/2009 | Schaaf et al. |
| 2009/0241061 | A1 | 9/2009 | Asai et al. |
| 2010/0082242 | A1 | 4/2010 | Park |
| 2010/0146436 | A1 | 6/2010 | Jakobson et al. |
| 2011/0047509 | A1 | 2/2011 | Arrasvuori |
| 2011/0087431 | A1 | 4/2011 | Gupta et al. |
| 2011/0173066 | A1 * | 7/2011 | Simmons ............. 705/14.49 |
| 2011/0196610 | A1 * | 8/2011 | Waldman et al. ....... 701/209 |

OTHER PUBLICATIONS

Google Maps: http://maps.google.com.
(Continued)

*Primary Examiner* — Jwalant Amin
(74) *Attorney, Agent, or Firm* — Ditthavong & Steiner, P.C.

(57) ABSTRACT

An approach is provided for providing list-based exploration of mapping data. The list-based exploration platform causes, at least in part, an association of one or more features of a geographical area with one or more list objects. Next, the list-based exploration platform processes and/or facilitates a processing of location information associated with one or more map data items to group, to sort, or a combination thereof the one or more map data items into the one or more list objects. Then, the list-based exploration platform causes, at least in part, a rendering of at least one of the one or more list objects in a user interface, wherein the user interface includes one or more user interface elements for controlling a browsing of the one or more map data items in the at least one of the one or more list objects.

20 Claims, 13 Drawing Sheets

(56) References Cited

OTHER PUBLICATIONS

Iaria, Giuseppe, et al., Cognitive Strategies Dependent on the Hippocampus and Caudate Nucleus in Human Navigation: Variability and Change with Practice, The Journal of Neuroscience, Jul. 2, 2003, pp. 5945-5952, vol. 23, No. 13, Quebec, Canada.
Office Action for corresponding European Patent Application No. 12832601.4-1951, dated Dec. 2, 2015, 8 Pages.
Office Action for corresponding European Patent Application No. 12832601.4-1951, dated Dec. 18, 2015, 1 Page.

* cited by examiner

METHOD AND APPARATUS FOR PROVIDING LIST-BASED EXPLORATION OF MAPPING DATA

BACKGROUND

Service providers and device manufacturers (e.g., wireless, cellular, etc.) are continually challenged to deliver value and convenience to consumers by, for example, providing compelling network services. One area of interest has been the development of services and technologies for discovering and presenting points of interest (POIs) within a geographical area. In this area, electronic mapping services are capable of providing vast stores of detailed information relating to the POIs or other geographical features (e.g., roads, terrain, etc.). However, the amount of mapping detail available from modern mapping services can quickly overwhelm a user's ability to comprehend the information, reducing effectiveness of the information. Accordingly, service providers and device manufacturers are challenged to develop new mechanisms for organizing and presenting such information in a more user-friendly manner.

SOME EXAMPLE EMBODIMENTS

Therefore, there is a need for an approach for providing list-based exploration of mapping data.

According to one embodiment, a method comprises causing, at least in part, an association of one or more features of a geographical area with one or more list objects. The method also comprises processing and/or facilitating a processing of location information associated with one or more map data items to group, to sort, or a combination thereof the one or more map data items into the one or more list objects. The method further comprises causing, at least in part, a rendering of at least one of the one or more list objects in a user interface, wherein the user interface includes one or more user interface elements for controlling a browsing of the one or more map data items in the at least one of the one or more list objects.

According to another embodiment, an apparatus comprises at least one processor, and at least one memory including computer program code for one or more computer programs, the at least one memory and the computer program code configured to, with the at least one processor, cause, at least in part, the apparatus to associate one or more features of a geographical area with one or more list objects. The apparatus is also caused to process and/or facilitate a processing of location information associated with one or more map data items to group, to sort, or a combination thereof the one or more map data items into the one or more list objects. The apparatus is further caused to render at least one of the one or more list objects in a user interface, wherein the user interface includes one or more user interface elements for controlling a browsing of the one or more map data items in the at least one of the one or more list objects.

According to another embodiment, a computer-readable storage medium carries one or more sequences of one or more instructions which, when executed by one or more processors, cause, at least in part, an apparatus to associate one or more features of a geographical area with one or more list objects. The apparatus is also caused to process and/or facilitate a processing of location information associated with one or more map data items to group, to sort, or a combination thereof the one or more map data items into the one or more list objects. The apparatus is further caused to render at least one of the one or more list objects in a user interface, wherein the user interface includes one or more user interface elements for controlling a browsing of the one or more map data items in the at least one of the one or more list objects.

According to another embodiment, an apparatus comprises means for causing, at least in part, an association of one or more features of a geographical area with one or more list objects. The apparatus also comprises means for processing and/or facilitating a processing of location information associated with one or more map data items to group, to sort, or a combination thereof the one or more map data items into the one or more list objects. The apparatus further comprises means for causing, at least in part, a rendering of at least one of the one or more list objects in a user interface, wherein the user interface includes one or more user interface elements for controlling a browsing of the one or more map data items in the at least one of the one or more list objects.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing list-based exploration of mapping data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
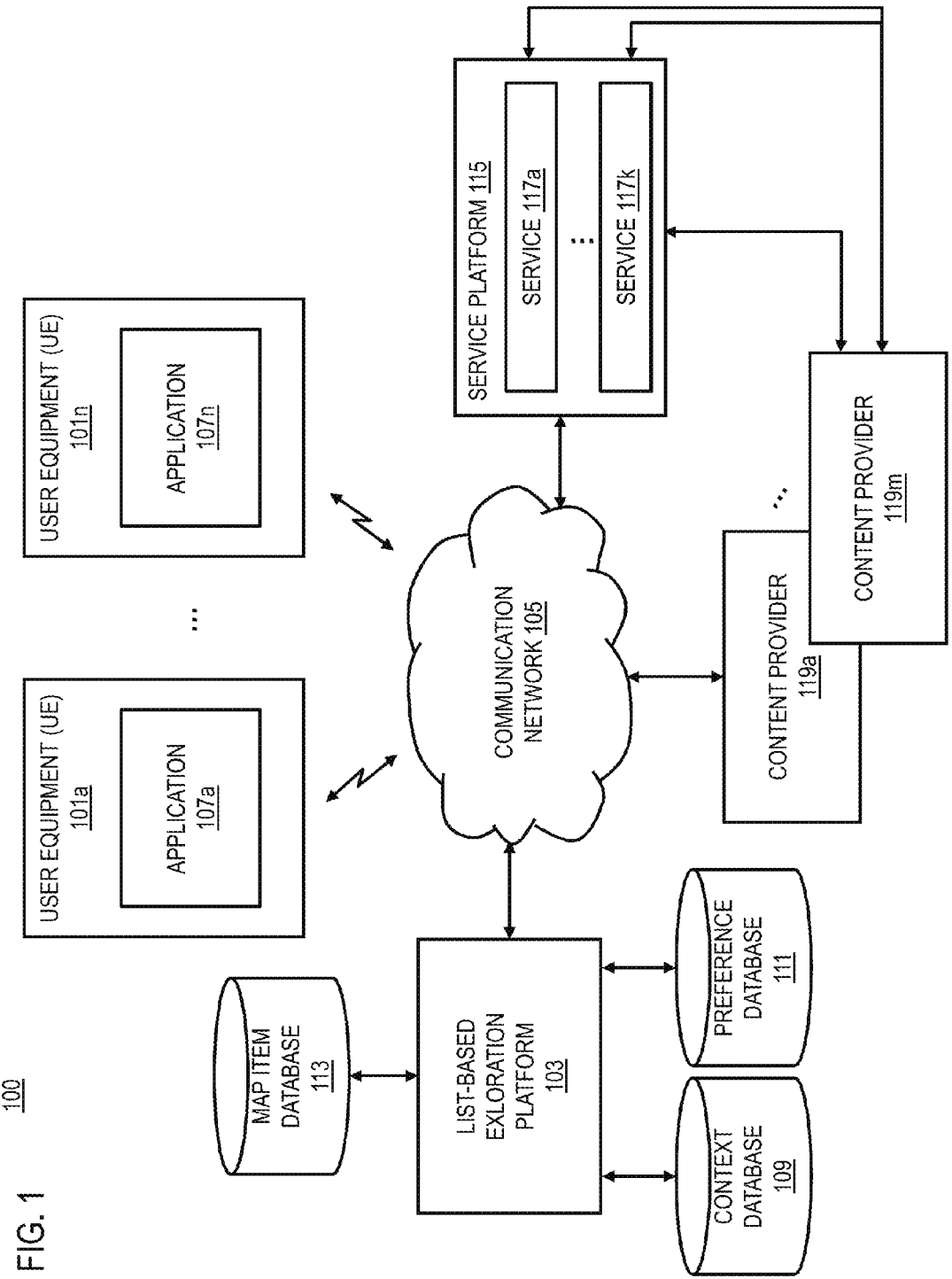
FIG. 1 is a diagram of a system capable of providing list-based exploration of mapping data, according to one embodiment.

FIG. 1 is a diagram of a system capable of providing list-based exploration of mapping data, according to one embodiment. As mentioned, electronic mapping services are capable of providing vast stores of detailed information relating to the POIs or other geographical features (e.g., roads, terrain, etc.). The amount of information, however, can quickly overwhelm a user's ability to comprehend the information, reducing effectiveness of the information. Nonetheless, drastic trimming of information available to the user can also have an adverse effect. For example, although POIs presented as icons on a two-dimensional map can provide useful information for users, these icons may be densely cluttered in particular areas of the map, making it difficult for users to browse through details with respect to these dense POI clusters. On the other hand, while a simple list of the POIs can provide for better organization of detailed information, such a list lacks spatial information important for users to perceive spatial relationships with respect to the POIs and other geographical features.

To address this problem, a system 100 of FIG. 1 introduces the capability to explore POIs by rendering list objects including map data items. Specifically, the system 100 may process location information associated with map data items to group and/or sort the map data items into lists associated with geographical features (e.g., roads, terrain, etc.) and enable browsing of map data items in a particular list by rendering that list in a suitable user interface. The user interface may, for instance, include user interface elements to allow a user to control the browsing of the map data items of the particular list (or other lists). In addition, the user interface may be provided to the user on an augmented reality display, a mixed reality display, a virtual reality display, a mapping display, and/or a navigation display.

In one scenario, a main street may associated with a particular list. As such, location information may be processed to determine map data items, such as POIs and streets, to be placed in the list as well as group identifiers for the respective map data items and the order in which the map data items are to be placed in the list or rendered. For example, geographic coordinates (e.g., latitude/longitude coordinates) along with spatial information with respect to the main street, other streets, and POIs may be utilized to make such a determination. In this case, the list may include POIs adjacent to one side (or both sides) of the main street as well as streets intersecting the main street. A street may, for instance, intersect another street if the two streets meet at a common point. When the list is rendered in a user interface, the rendering may include a graphical depiction of the main street as a vertical street as well as graphical depictions of POIs and streets of the list along one side (or both sides) of the main street.

More specifically, the system 100 may cause, at least in part, an association of one or more features of a geographical area with one or more list objects. A list may, for instance, be associated with one side of a particular feature and another list may be associated with another side of that feature (e.g., a list for each side of a street). Alternatively, a list may be associated with all sides of the particular feature. The system 100 may then process and/or facilitate a processing of location information associated with one or more map data items to group, to sort, or a combination thereof the one or more map data items into the one or more list objects. As mentioned, the location information may include a number of types of data, such as geographic coordinates, spatial information with respect to the one or more features, etc. The system 100 may further cause, at least in part, a rendering of at least one of the one or more list objects in a user interface, wherein the user interface includes one or more user interface elements for controlling a browsing of the one or more map data items in the at least one of the one or more list objects. As mentioned, the user interface may be provided to a user on an augmented reality display, a mixed reality display, a virtual reality display, a mapping display, and/or a navigation display.

As shown in FIG. 1, the system 100 comprises a user equipment (UE) 101 (or UEs 101a-101n) having connectivity to a list-based exploration platform 103 via a communication network 105. The UE 101 may include or have access to an application 107 (e.g., applications 107a-107n) to enable the UE 101 to interact with, for instance, the list-based exploration platform 103 to (a) present map data items of a list based on the association of one or more lists with respective features, (b) process location information for grouping and sorting of map data items into the lists, (c) process semantic information associated with the respective features, (d) interact with users to render various subsets of the list or other lists, or (e) perform other functions. The list-based exploration platform 103 may include or have access to a context database 109 to access or store context information associated with one or more users, POIs, and other map data items. The list-based exploration platform 103 may also include or have access to a preference database 111 to access or store preference information associated with one or more users. The list-based exploration platform may further include or have access to a map item database 113 to access or store data associated with the map data items as well as geographical features, such as tiles, icons, textual representations, media content, etc. The content (or data) associated with the map data items and the geographical features may, for instance, be provided by a service platform 115, one or more services 117 (or services 117a-117k), one or more content providers 119 (or content providers 119a-119m), and/or other services available over the communication network 105. For example, a particular service 117 (e.g., a mapping service) may obtain content (e.g., tiles, icons, textual representations, media content, etc.) from a particular content provider 119 to offer the content to the UE 101. It is noted that the list-based exploration platform 103 may be a separate entity of the system 100, a part of the one or more services 117 of the service platform 115, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the list-based exploration platform 103 may process and/or facilitate a processing of semantic information associated with the one or more features, the one or more map data items, or a combination thereof, wherein the rendering of the at least one of the one or more list objects is based on the semantic information. By way of example, a list associated with a street may include various map data items, such as POIs, open fields, other streets, etc. The semantic information may, for instance, indicate that certain streets are private roads while other streets are interstate highways, that specific open fields are farms while other open fields are public space, etc. In addition, the semantic information may indicate the relationship between the various map data items and the geographical features, such as whether the street associated with the list intersects with map data items in the list. As such, the list-based exploration platform 103 may render the list according to this information.

In another embodiment, the list-based exploration platform 103 may determine one or more subsets of the at least one of the one or more list objects for rendering based on the grouping, the sorting, or a combination thereof. As such, the rendering of the at least one of the one or more list objects may be based on the one or more subsets. In a further embodiment, the one or more subsets may be further based on context information, preference information, or a combination thereof associated with a user. By way of an example, an initial set of subsets of a list may be determined based on how the map data items are grouped and/or sorted in the list. Based on the initial set, a second set of subsets may then be determined based on the context information and/or the preference information of the user. In one scenario, the list-based exploration platform 103 may exclude POIs determined to be currently unavailable to the user (e.g., the store is currently closed) from subsets to be selected for rendering. In another scenario, the list-based exploration platform 103 may exclude POIs determined to be of no interest to the user from subsets to be selected for rendering. The selected set of subsets may then be rendered, as part of the rendering of the list, based on the order of map data items as sorted in the respective subsets and the order of the subsets as sorted in the list. A POI that is first in a particular subset may, for instance, be presented as the first POI for that subset. POIs included within that subset may be POIs located between two particular streets (e.g., two streets intersecting the street associated with the list) while other subsets may include POIs located between other streets. Additionally, or alternatively, the one or more subsets may be further based on an orientation, a direction of movement, or a combination thereof associated with the user. For example, the ordering of map data items in the one or more subsets may be based on the orientation and/or the direction of movement associated with the user.

In another embodiment, the list-based exploration platform 103 may determine an activation of at least one of the one or more user interface elements. A user interface element may, for instance, be activated when the user clicks, taps, or maneuvers the user interface element (e.g., dragging, gestures, etc.). Based on the activation, the list-based exploration platform 103 may render one or more other subsets of the at least one of the one or more list objects. As an example, a user may want to see the available POIs further ahead of the POIs currently presented on the user interface. As such, the user may swipe downward on a touch screen display associated with the user interface, causing the rendering of the subsets that include some of the available POIs further ahead of the currently presented POIs.

In another embodiment, the list-based exploration platform 103 may determine a selection of at least one of the one or more map data items in the at least one of the one or more list objects. The list-based exploration platform 103 may then render at least another one of the one or more list objects based on the selection. In a further embodiment, (a) the at least one of the one or more list objects corresponds with at least one of the one or more features, (b) the at least another one of the one or more list objects and the at least one of the one or more map data items corresponds with at least another one of the one or more features, and (c) the at least one of the one or more features intersects with the at least another one of the one or more features. In one use case, a user traveling along a main street may be presented with a rendered version of a list associated with the main street. The list may, for instance, include POIs running alongside the main street and cross streets that intersect with the main street. While traveling, the user may be interested in exploring the POIs of one of the cross streets. As such, the user can tap on one of the cross streets presented in the user interface to view the POIs of the desired cross street. Accordingly, a rendered version of a list associated with the desired cross street may be presented to the user. The list may, for instance, include the POIs running alongside the desired cross street and the cross streets that intersect with the desired cross street.

In another embodiment, the list-based exploration platform 103 may render the one or more features based on a density with respect to the one or more map data items. The density may, for instance, be the number of certain map data items (e.g., POIs) between two features (e.g., streets). As such, the one or more features may not be to scale as rendered on the user interface. By way of example, a user traveling along a main street may be presented with a rendered version of a list associated with the main street. As rendered, a first section (e.g., the area between two cross streets) of the main street may appear to be longer in length than a second section (e.g., the area between two other cross streets) of the main street even if the first section of the main street is in reality shorter in length than the second section. The first section may, for instance, appear longer in length than the second section if the first section contains more POIs than the second section. In this way, since densely POI-populated sections are provided more space on the user interface, issues related to cluttered browsing with respect to densely POI-populated areas are mitigated.

In another embodiment, the list-based exploration platform 103 may select the at least one of the one or more list objects for rendering based on context information, preference information, or a combination thereof associated with a user. As discussed, in one scenario, a user traveling along a main street may be presented with a rendered version of a list associated with the main street. In this scenario, the rendering of the list may, for instance, be based on the user's current location on the main street.

In another embodiment, the list-based exploration platform 103 may process and/or facilitate a processing of schematic information associated with the geographical area. Based on the schematic information, the list-based exploration platform 103 may further group, sort, or a combination thereof the one or more map data items in the one or more list objects. In one use case, the schematic information may be utilized to determine the order of map data items for a particular list object.

By way of example, the UE 101, the list-based exploration platform 103, the service platform 115, the services 117, and the content providers 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
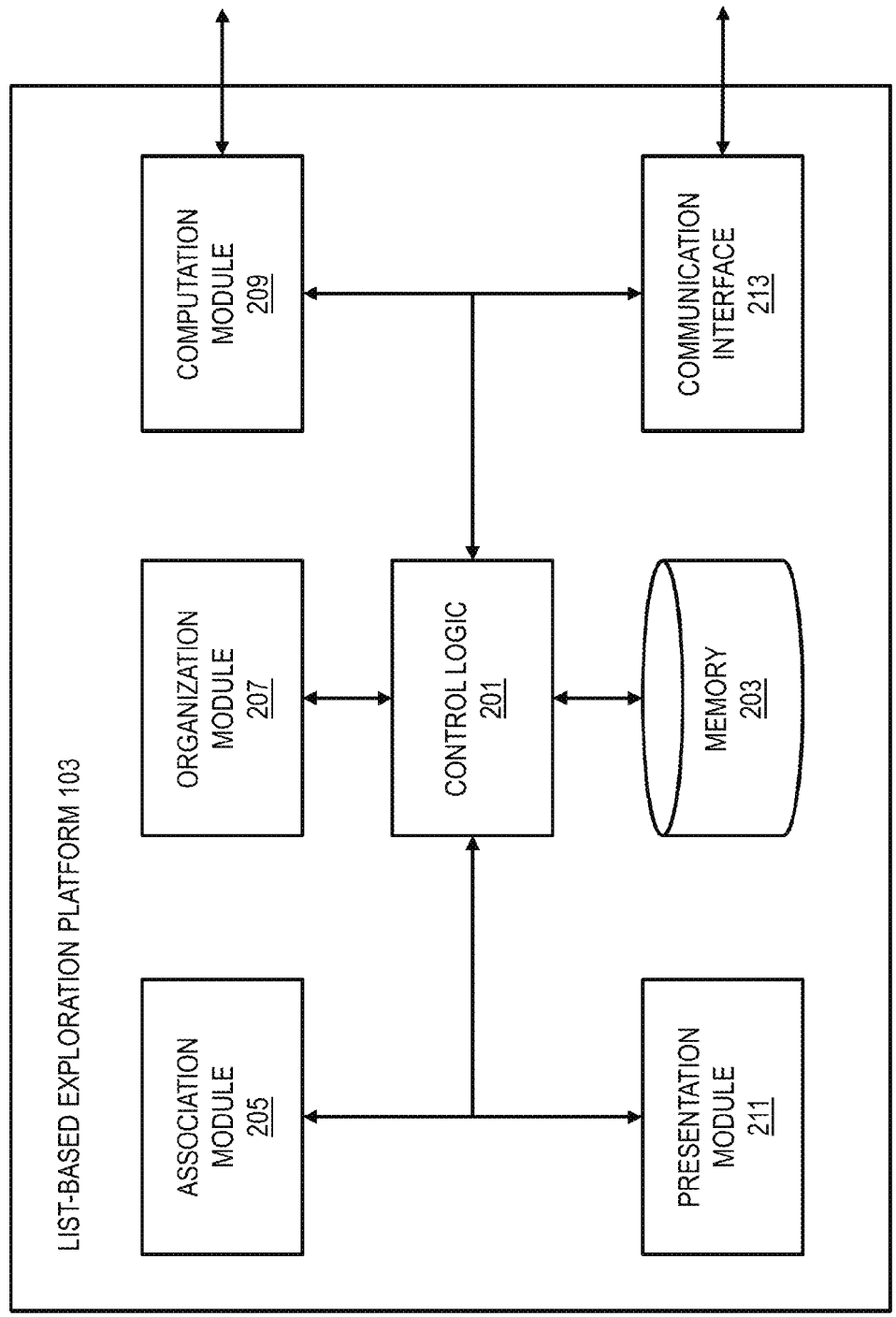
FIG. 2 is a diagram of the components of a list-based exploration platform, according to one embodiment.

FIG. 2 is a diagram of the components of a list-based exploration platform, according to one embodiment. By way of example, the list-based exploration platform 103 includes one or more components for providing list-based exploration of mapping data. It is contemplated that the functions of these components may be combined in one or more components or performed by other components of equivalent functionality. In this embodiment, the list-based exploration platform 103 includes control logic 201, memory 203, an association module 205, an organization module 207, a computation module 209, a presentation module 211, and a communication interface 213.

The control logic 201 executes at least one algorithm for executing functions of the list-based exploration platform 103. For example, the control logic 201 may interact with the association module 205 to associate features of a geographical area with list objects. The association module 205 may also work with the organization module 207 and the computation module 209 to process location information associated with map data items to group and/or sort the map data items into the various list objects. If, for instance, the location information only includes geographical coordinates, the computation module 209 may utilize the coordinates to calculate the spatial relationships between the map data items and/or the geographical features. The organization module 207 may then process the information relating to the spatial relationships to group and sort the map data items into the various list objects.

Next, the control logic 201 may direct the presentation module 211 to render at least one of the various list objects. The presentation module 211 may, for instance, determine the list (or lists) to be rendered based on context information and preference information associated with a user. In some embodiments, the organization module 207 may determine subsets of the list based on the grouping and the sorting of the list as well as the context information and the preference information associated with the user. The presentation module 211 may then determine which of the subsets to render as part of the list rendering process.

The control logic 201 may also utilize the communication interface 213 to communicate with other components of the list-based exploration platform 103, the UEs 101, the service platform 115, the content providers 119, and other components of the system 100. For example, the communication interface 213 may transmit spatial information calculated by the computation module 209 to the organization module 207 to group and sort the map data items into the various list objects. The communication interface 213 may further include multiple means of communication. In one use case, the communication interface 213 may be able to communicate over SMS, internet protocol, instant messaging, voice sessions (e.g., via a phone network), or other types of communication.

Figure 3:
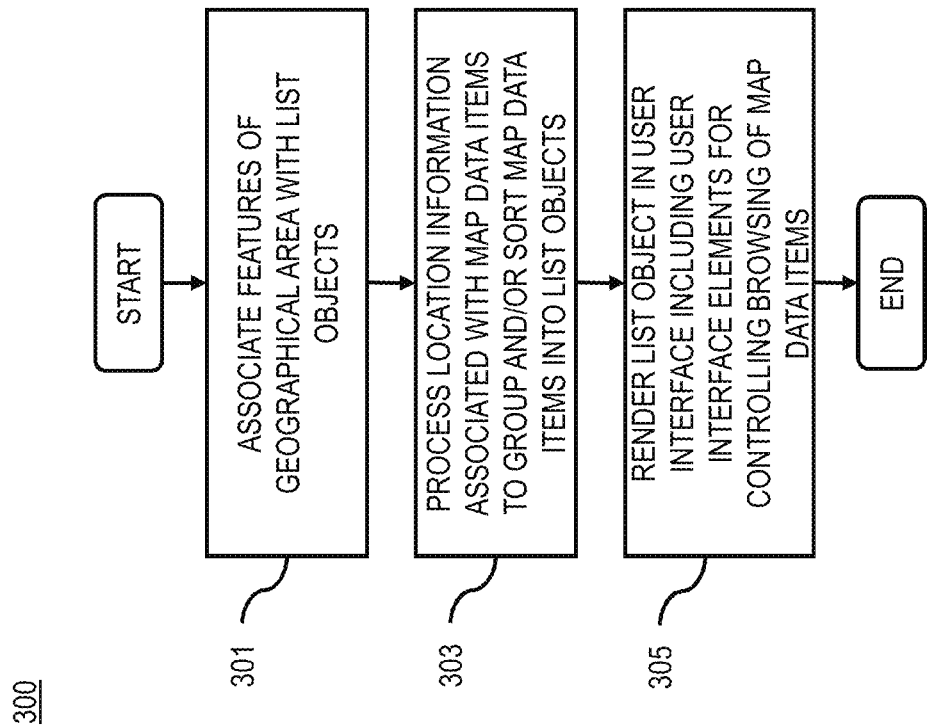
FIG. 3 is a flowchart of a process for providing list-based exploration of mapping data, according to one embodiment.
Figure 10:
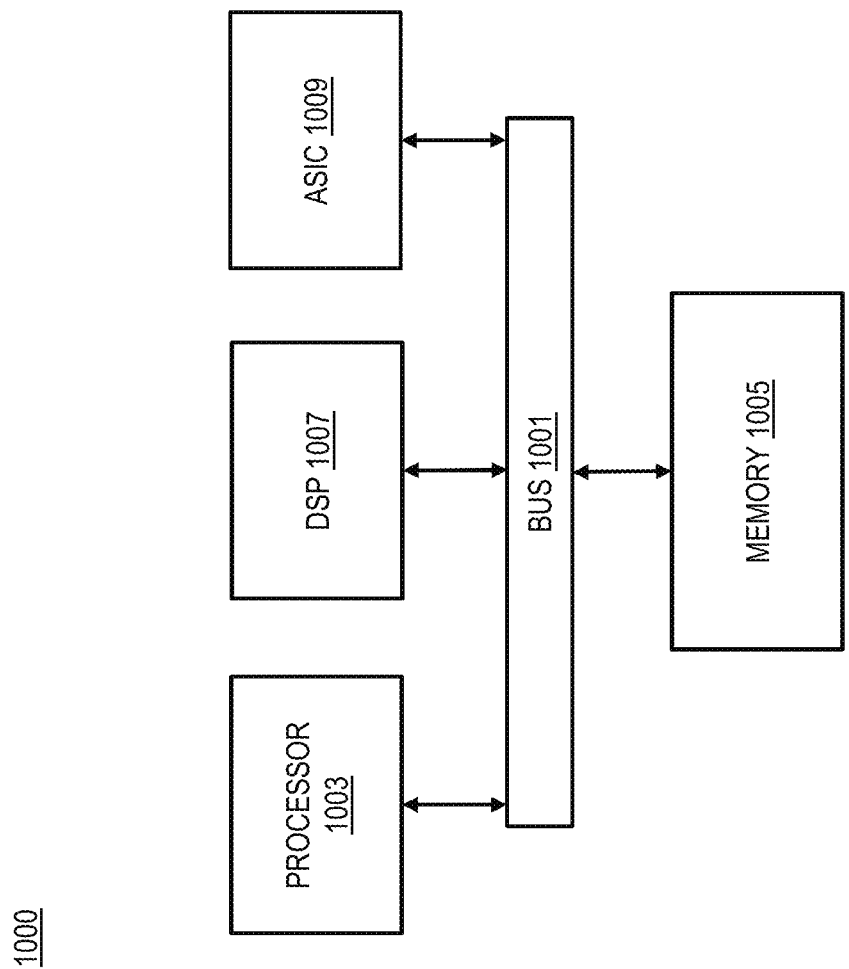
FIG. 10 is a diagram of a chip set that can be used to implement an embodiment of the invention.

FIG. 3 is a flowchart of a process for providing list-based exploration of mapping data, according to one embodiment. In one embodiment, the list-based exploration platform 103 performs the process 300 and is implemented in, for instance, a chip set including a processor and a memory as shown in FIG. 10. As such, the control logic 201 can provide means for accomplishing various parts of the process 300 as well as means for accomplishing other processes in conjunction with other components of the list-based exploration platform 103. In step 301, the control logic 201 may cause an association one or more features of a geographical area with one or more list objects. As discussed, a list may, for instance, be associated with one side of a particular feature and another list may be associated with another side of that feature (e.g., a list for each side of a street). In some embodiments, a list may be associated with some or all sides of the particular feature.

In step 303, the control logic 201 may process and/or facilitating a processing of location information associated with one or more map data items to group, to sort, or a combination thereof the one or more map data items into the one or more list objects. As mentioned, the location information may include a number of data types, such as geographic coordinates, spatial information with respect to the one or more features, etc. By way of example, the one or more map data items may be grouped and/or sorted into the one or more list objects based on the association of the one or more features with the one or more list objects. In one scenario, a particular map data item may, for instance, be grouped and/or sorted into a list object if the map data item and the list object corresponds with the same feature.

In step 305, the control logic 201 may cause a rendering of at least one of the one or more list objects in a user interface. The user interface may, for instance, include one or more user interface elements for controlling a browsing of the one or more map data items in the at least one of the one or more list objects. As discussed, the user interface may be provided to a user on an augmented reality display, a mixed reality display, a virtual reality display, a mapping display, and/or a navigation display.

Figure 4:
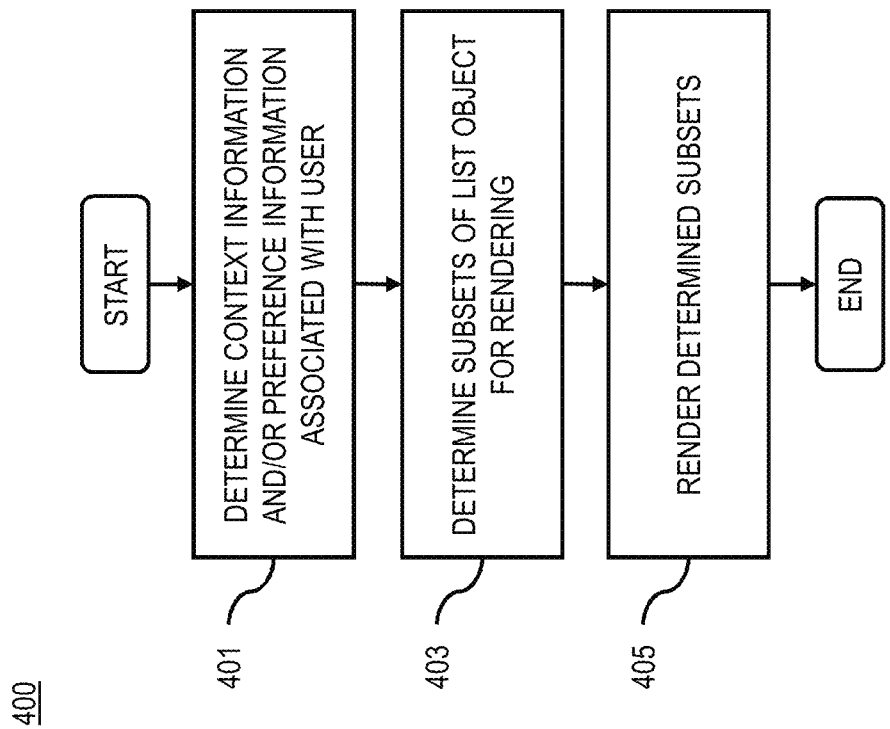
FIG. 4 is a flowchart of a process for rendering subsets of a list, according to one embodiment.

FIG. 4 is a flowchart of a process for rendering subsets of a list, according to one embodiment. In one embodiment, the list-based exploration platform 103 performs the process 400 and is implemented in, for instance, a chip set including a processor and a memory as shown in FIG. 10. As such, the control logic 201 can provide means for accomplishing various parts of the process 400 as well as means for accomplishing other processes in conjunction with other components of the list-based exploration platform 103. In step 401, the control logic 201 may determine context information, preference information, or a combination thereof associated with a user. The context information may, for instance, include the current time, location of the user (e.g., past, present, or future location), etc. The preference information may indicate the user's interests (or lack of interest) in a time, place, activity, person, etc.

In step 403, the control logic 201 may determine one or more subsets of the at least one or more list objects for rendering based on the context information, the preference information, or a combination thereof. By way of example, certain map data items may be excluded from subsets for rendering based on the context information. In one use case, the user may want to explore available POIs of a particular area relatively far (e.g., an hour driving distance) from the user's current location (e.g., the user's home). The control logic 201, via the computation module 209, may determine the time it would take for the user to arrive at the area using the routes and distances to the desired location and the user's estimated driving speed. Based on that time, POIs may be excluded from the one or more subsets for rendering if the POIs are unavailable (e.g., access to the POIs will be unavailable) at the estimated time of arrival. In addition, the one or more subsets may be further based on the grouping, the sorting, or a combination thereof of the map data items in the at least one of the one or more lists. Accordingly, in step 405, the control logic 201 may render the one or more subsets as part of the rendering of the at least one of the one or more list objects.

Figure 5:
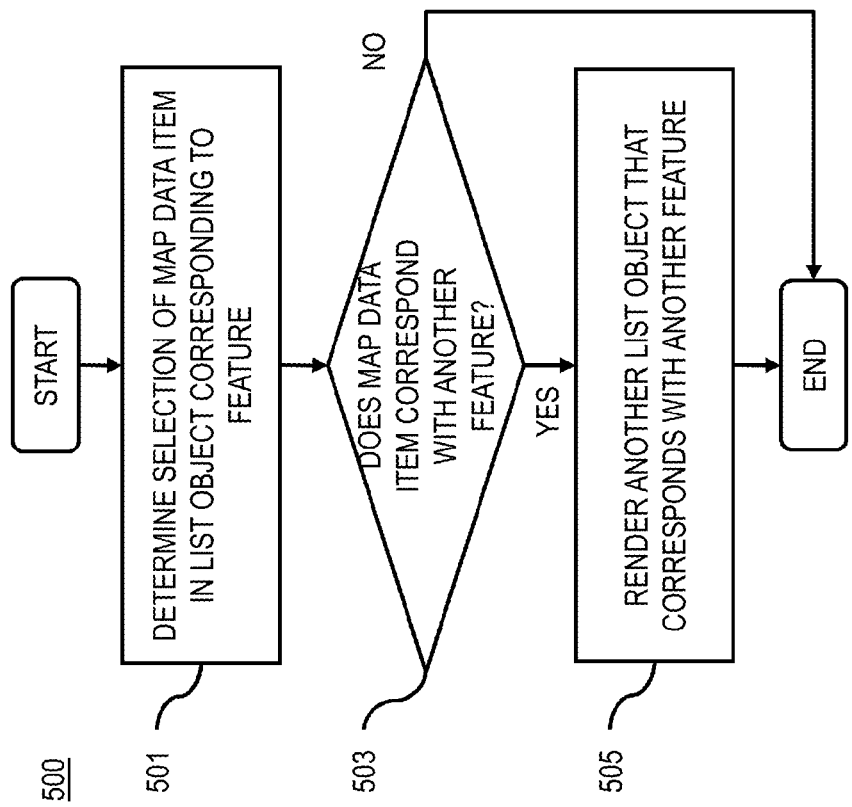
FIG. 5 is a flowchart of a process for exploration of mapping data based on other lists, according to one embodiment.

FIG. 5 is a flowchart of a process for exploration of mapping data based on other lists, according to one embodiment. In one embodiment, the list-based exploration platform 103 performs the process 500 and is implemented in, for instance, a chip set including a processor and a memory as shown in FIG. 10. As such, the control logic 201 can provide means for accomplishing various parts of the process 500 as well as means for accomplishing other processes in conjunction with other components of the list-based exploration platform 103. In step 501, the control logic 201 may determine a selection of at least one of the one or more map data items in the at least one of the one or more list objects, for instance, by a user. Based on a previous association of the one or more features with the one or more list objects, the at least one of the one or more list objects may correspond with at least one of the one or more features.

In step 503, the control logic 201 may determine whether the at least one of the one or more map data items corresponds with at least another one of the one or more features. If, for instance, it is determined that the at least one of the one or more map data items corresponds with the at least another one of the one or more features, the control logic 201 may, as in step 505, cause a rendering of at least another one of the one or more list objects, wherein the at least another one of the one or more list objects corresponds with the at least another one of the one or more features. By way of example, a rendered list associated with a particular street (e.g., at least one of the one or more features) may only include certain map data items, such as POIs and cross streets intersecting the particular street. Streets may, for instance, include any man-made or natural path for walking, running, biking, driving, swimming, etc. As mentioned, a user may select (e.g., clicking, tapping, etc.) one of the cross streets to view a rendered list associated with that cross street. Upon selection, the list associated with the selected cross street will be rendered and presented to the user.

Figure 6B:
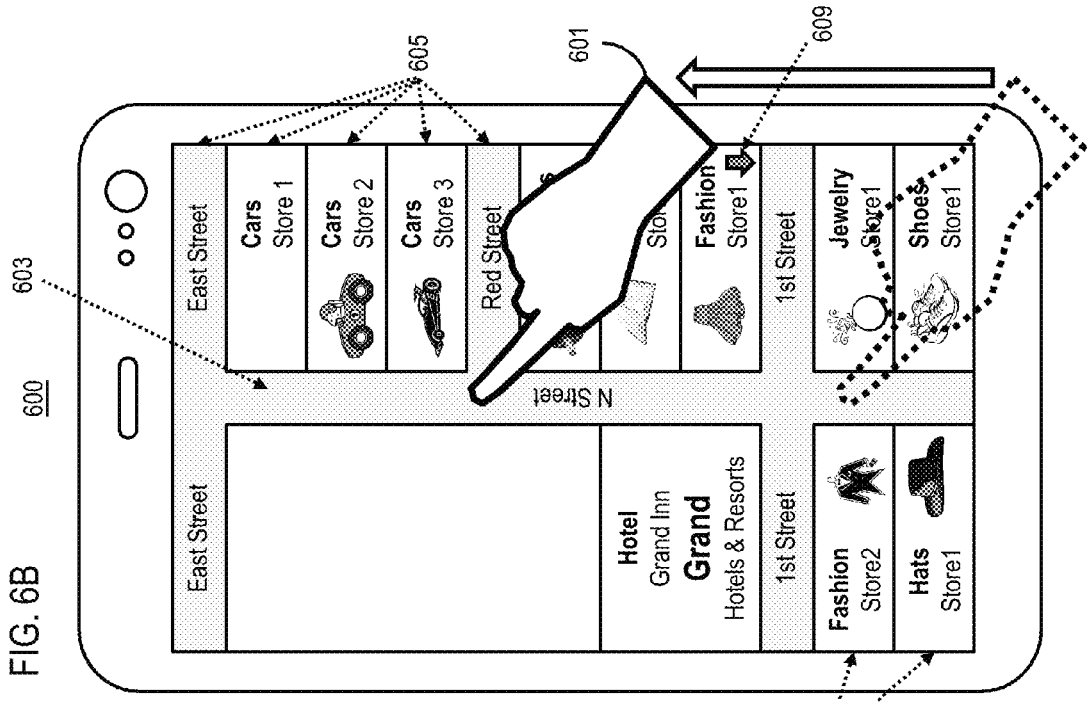
FIGS. 6A-6F are diagrams of a user interface utilized in the processes of FIGS. 3-5, according to various embodiments.
Figure 6A:
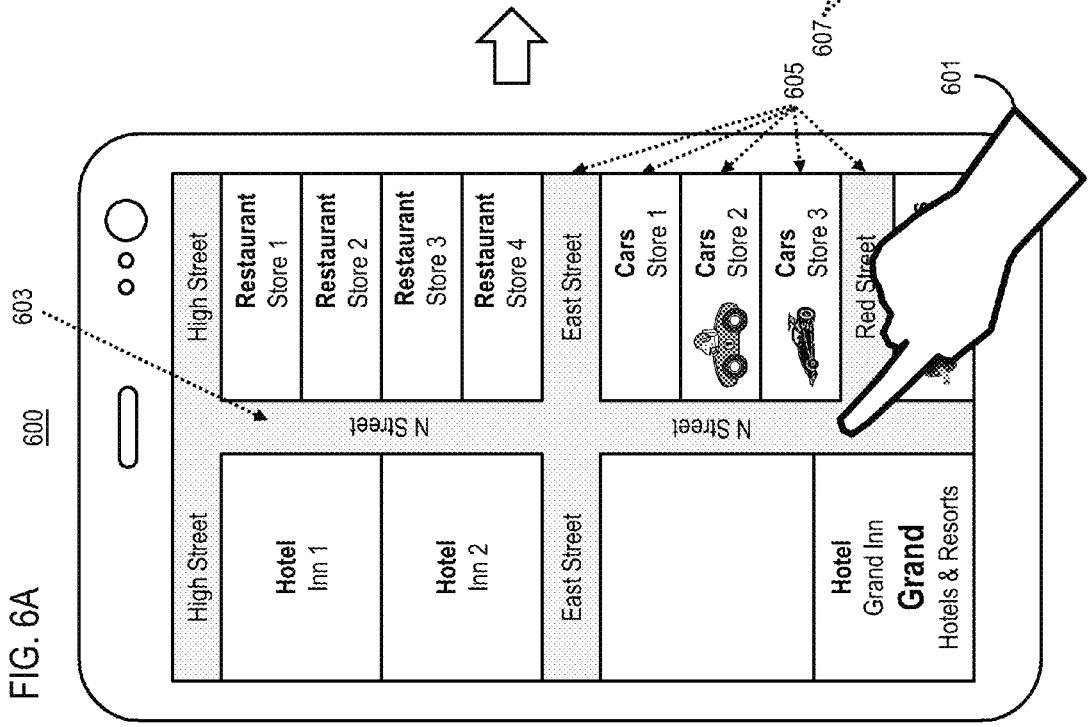

FIGS. 6A-6F are diagrams of a user interface utilized in the processes of FIGS. 3-5, according to various embodiments. FIG. 6A illustrates a user interface 600 and a user 601 interacting with the user interface 600. As shown, a list associated with a feature 603 of a particular geographical area is rendered on the user interface 600. The list includes map data items 605 (e.g., streets and/or POIs 605) along with other map data items corresponding with the feature 603 (e.g., "N Street"). In one scenario, for instance, the user 601 may interact with the user interface 600 by clicking or tapping on a map data item (e.g., map data items 605). For example, clicking or tapping on a POI may open up a detail view for the particular POI. In another scenario, the rendering of the list (e.g., the orientation of rendered the list, the map data items, etc.) may be based on the orientation and/or the direction of movement associated with the user 601. Additionally, or alternatively, the orientation of the rendered list may be modified (e.g., changing the orientation of the rendered list by 180 degrees) manually by the user.

As illustrated in FIG. 6B, the user 601 has performed an upward swipe gesture (e.g., associated with one or more user interface elements of the user interface 600), indicating that the user 601 wishes to scroll down the list and explore other map data items. Consequently, other subsets of the list (e.g., other subsets previously not presented) are rendered. For example, one of the other subsets may include map data items 607, which are now presented on the user interface 600. In addition, an indicator 609 (e.g., a user interface element) has appeared as a result of the upward swipe gesture to signify that there are other map data items between "Red Street" and "1st Street." Specifically, the indicator 609 suggests that the user 601 may explore the other map data items between "Red Street" and "1st Street" that are currently not shown to the user 601.

Figure 6C:
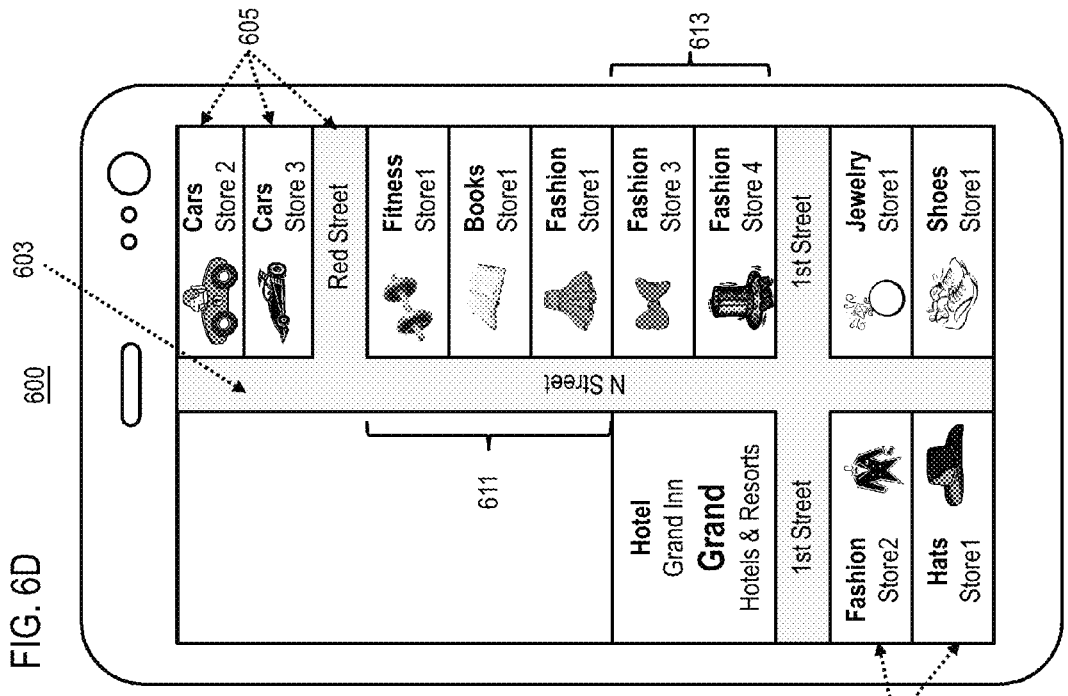
Figure 6D:
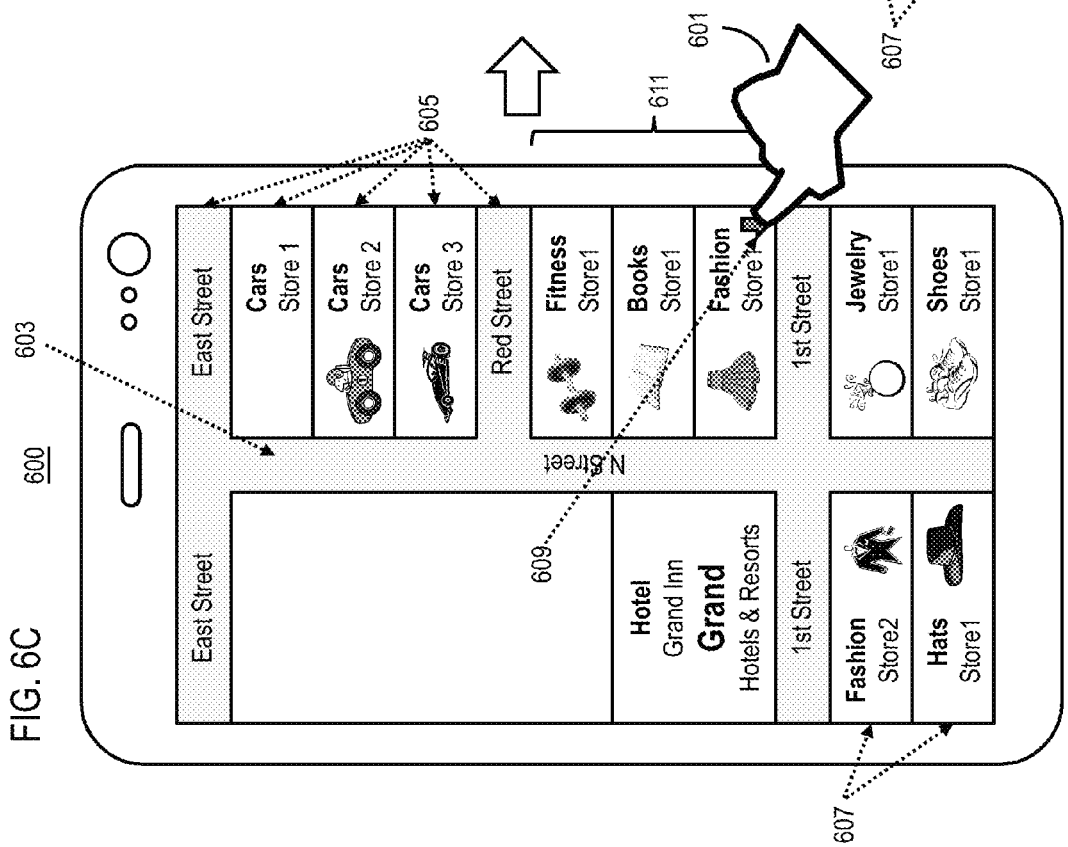

As demonstrated in FIG. 6C, the user 601 is focusing on a subset 611 (e.g., including "Fitness: Store 1," "Books: Store 1," "Fashion: Store 1"). The user 601 then clicks or taps the indicator 609 to indicate that the user 601 wishes to explore other map data items between "Red Street" and 1st Street." As a result, as shown in FIG. 6D, a subset 613 is rendered to expand the number of map data items available by presenting the other map data items to the user 601. As discussed, a feature may be rendered based on a density with respect to the one or more map data items. The density may, for instance, be the number of certain map data items (e.g., POIs) between two features (e.g., streets). As such, the one or more features may not be to scale as rendered on the user interface. By way of example, the length of the rendered portion of "N Street" between "Red Street" and "1st Street" is based on the number of POIs between "Red Street" and "1st Street." For the purpose of illustration, in FIG. 6C, only three POIs between "Red Street" and "1st Street" were initially presented to the user (e.g., based on preference information associated with the user). However, it is noted that the length of a particular portion of a rendered street (e.g., associated with the rendered list) may increase with the increase in the number of POIs along that portion of the rendered street. As indicated in FIG. 6C, the length of a particular portion of a rendered street may be limited, for instance, where the number of POIs along that portion is substantially large (e.g., more than 20 shops in a single block). In such a case, an indicator (e.g., indicator 609, "show 20 more POIs," etc.) may be presented to indicate that there are more POIs available along that portion of the rendered street.

Figure 6F:
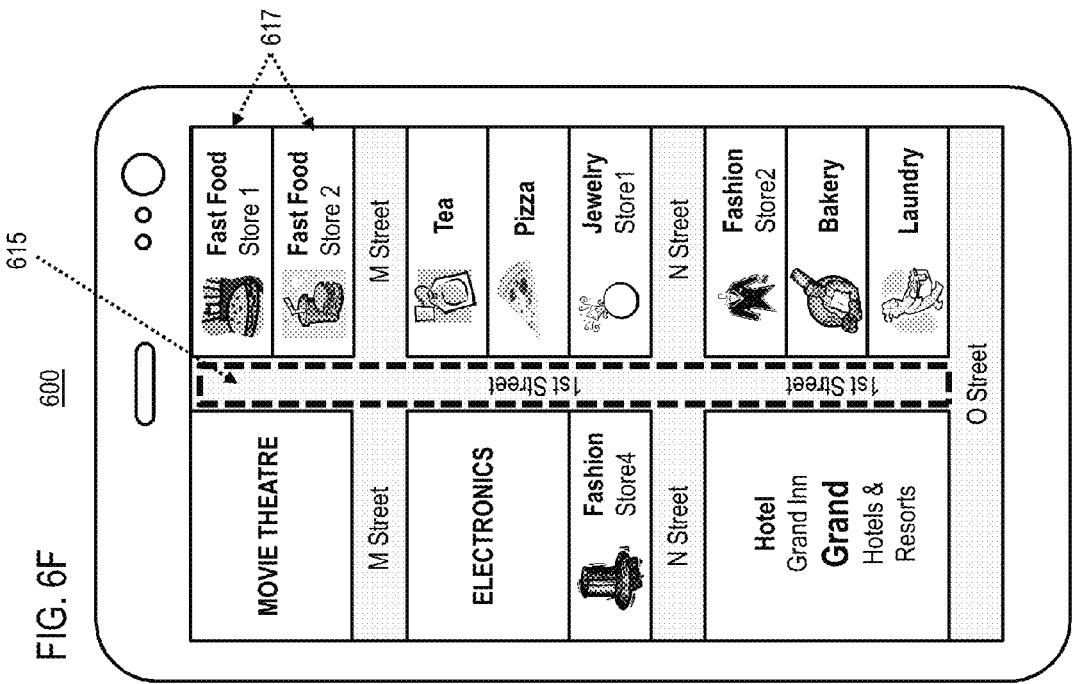
Figure 6E:
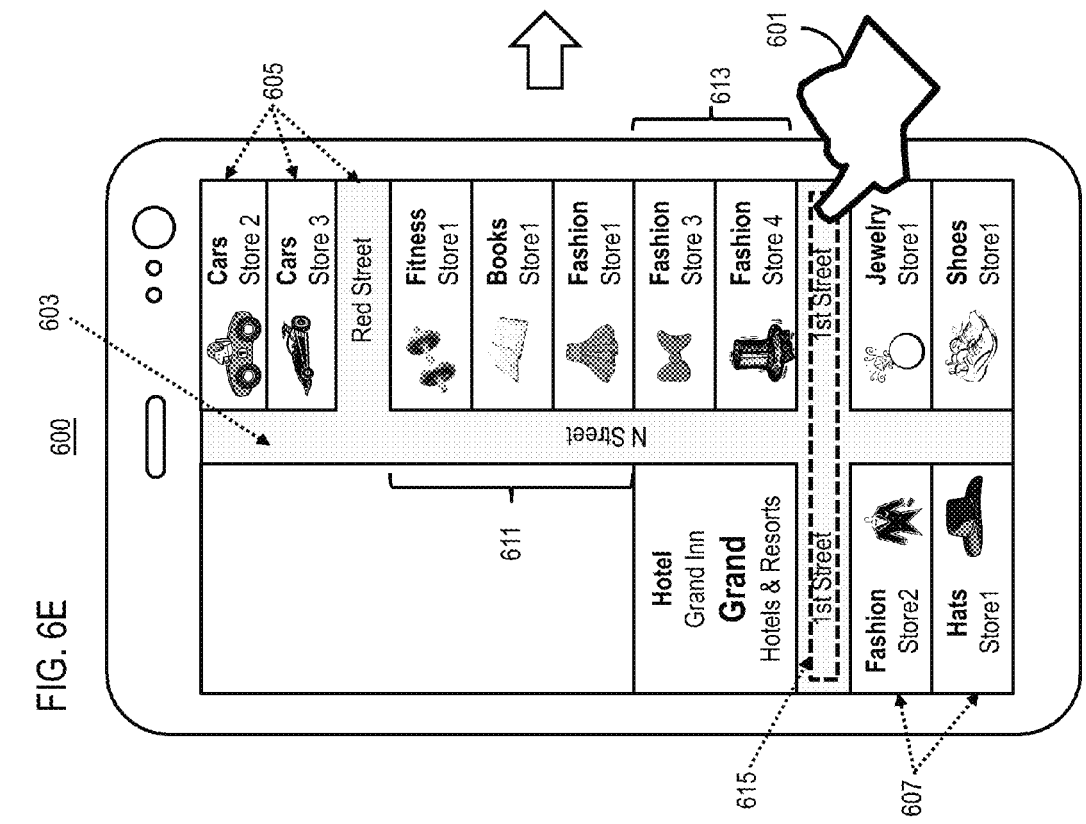

As shown in FIG. 6E, the user 601 has selected a map data item 615 (or feature 615). Because the map data item 615 corresponds with "1st Street" (e.g., feature 615) and "1st Street" intersects with "N Street" (e.g., feature 603), the selection of the map data item 615 indicates that the user 601 wishes to explore map data items associated with the list corresponding to "1st Street." Consequently, as illustrated in FIG. 6F, the user interface 600 is modified to render the list corresponding to "1st Street" (e.g., feature 615) for the user 601. For example, two POIs (e.g., map data items 617) in the list corresponding to "1st Street" are presented to the user 601. In one scenario, "O Street" may be the last map data item in the list corresponding with "1st Street" (depending on the ordering of the map data items in the list) if "1st Street" ends at "O Street." Thus, if the user 601 performs another upward swipe gesture to indicate that the user 601 wishes to scroll down the list, further downward scrolling may not be enabled. Accordingly, other subsets of the list may not be rendered. Consequently, to view other map data items past "O Street," the user may need to view other lists corresponding with streets other than "1st Street" (e.g., lists corresponding with "O Street"). In another scenario, there may be other map data items below "O Street" in the list corresponding with "1st Street" (depending on the ordering of the map data items in the list) even if "1st Street" technically ends at "O Street." For example, a user continuing on the path corresponding to "1st Street" past "O Street" may notice that the name of "1st Street" changes on the other side of "O Street." Accordingly, in such a situation, further downward scrolling (e.g., via another upward swipe gesture) would present the user with the path corresponding to "1st Street" under the new name as well as other map data items associated with the same list that are alongside the path.

Figure 7:
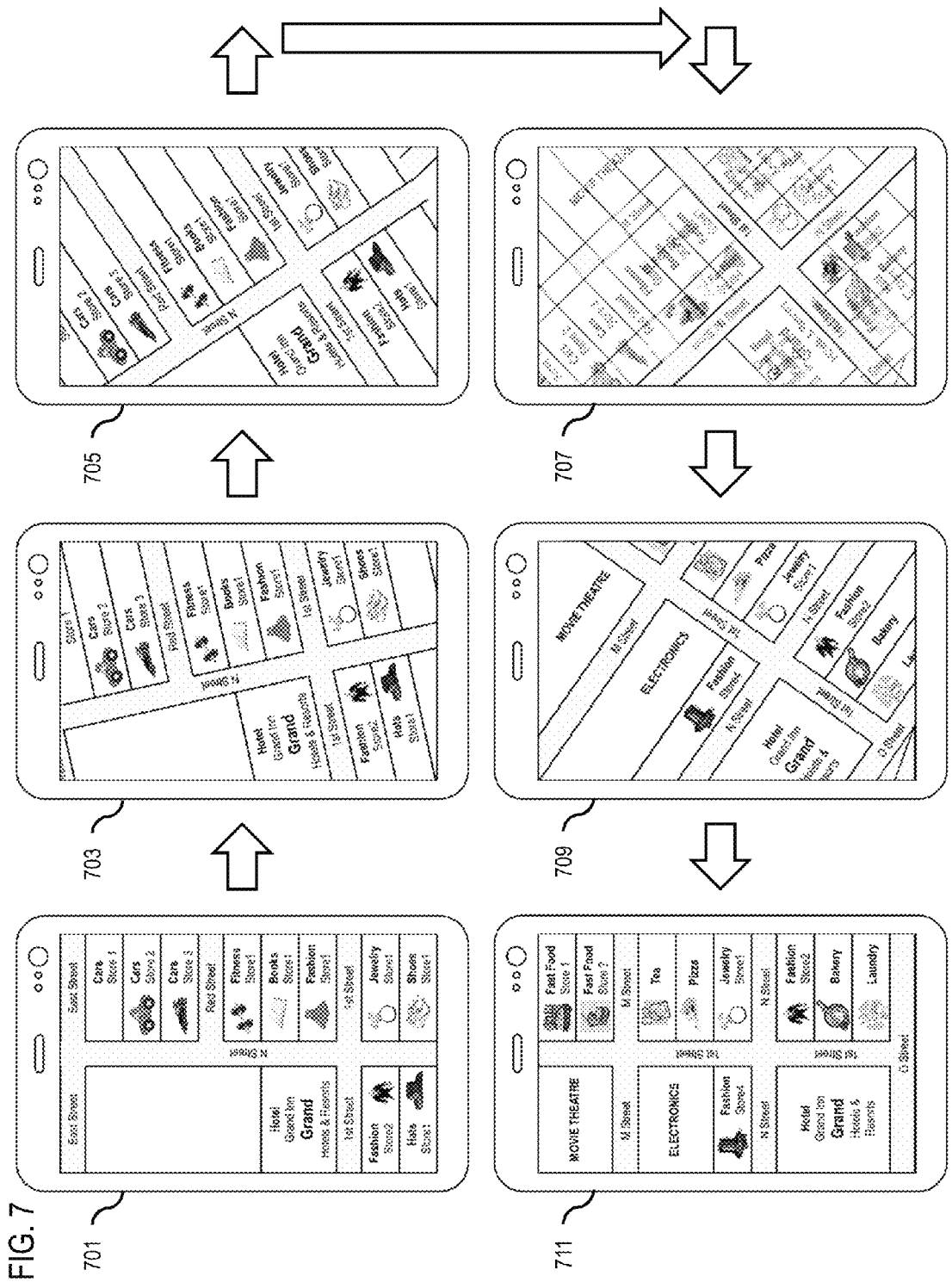
FIG. 7 is a diagram illustrating transitions of a user interface from a rendering of one list to a rendering of another list, according to one embodiment.

FIG. 7 is a diagram illustrating transitions of a user interface from a rendering of one list to a rendering of another list, according to one embodiment. As shown, the diagram illustrates the transitions (e.g., states 701-711 of the user interface 600 when a cross street intersecting the street corresponding with a currently rendered list is selected by a user (such as the transition of the user interface 600 from FIG. 6E to FIG. 6F). By way of example, when "1st Street" is clicked while the user is presented with state 701, the state 701 will transition to state 711. State 701, for instance, illustrates a rendering of a list corresponding with "N Street," while state 711 illustrates a rendering of a list corresponding with "1st Street." As demonstrated in states 701-711, the user interface (e.g., user interface 600) provides for a rotation as well as additional morphing and blending. Thus, the user will experience a smooth transition from state 701 to state 711.

Figure 8A:
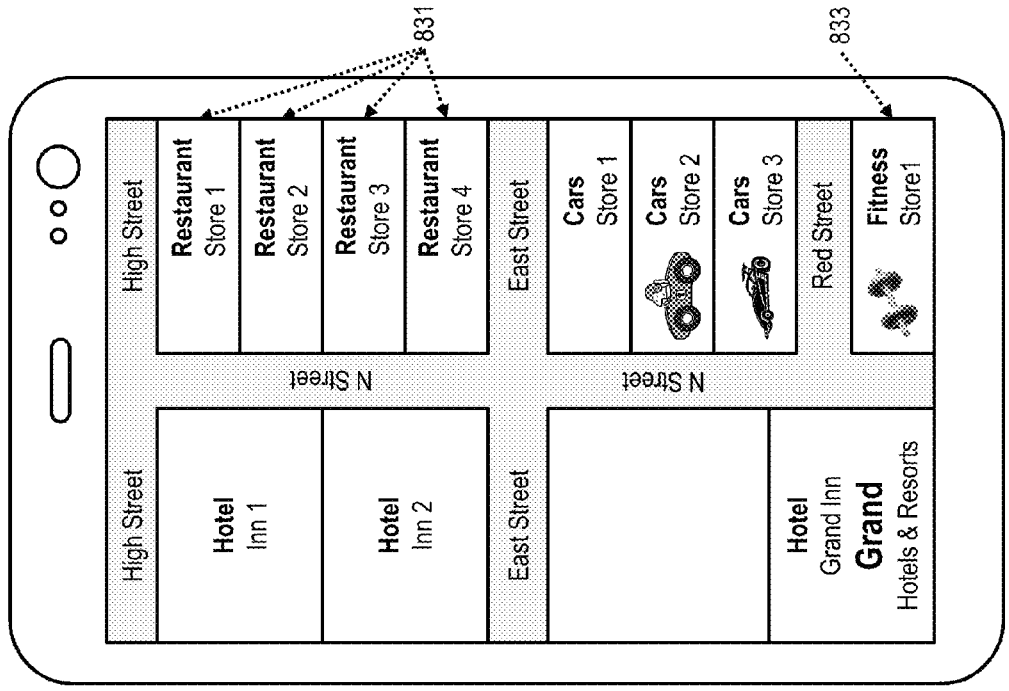
FIGS. 8A and 8B are, respectively, diagrams of a user interface associated with conventional mapping, and a user interface utilized in the processes of FIG. 3 according to one embodiment.
Figure 8B:
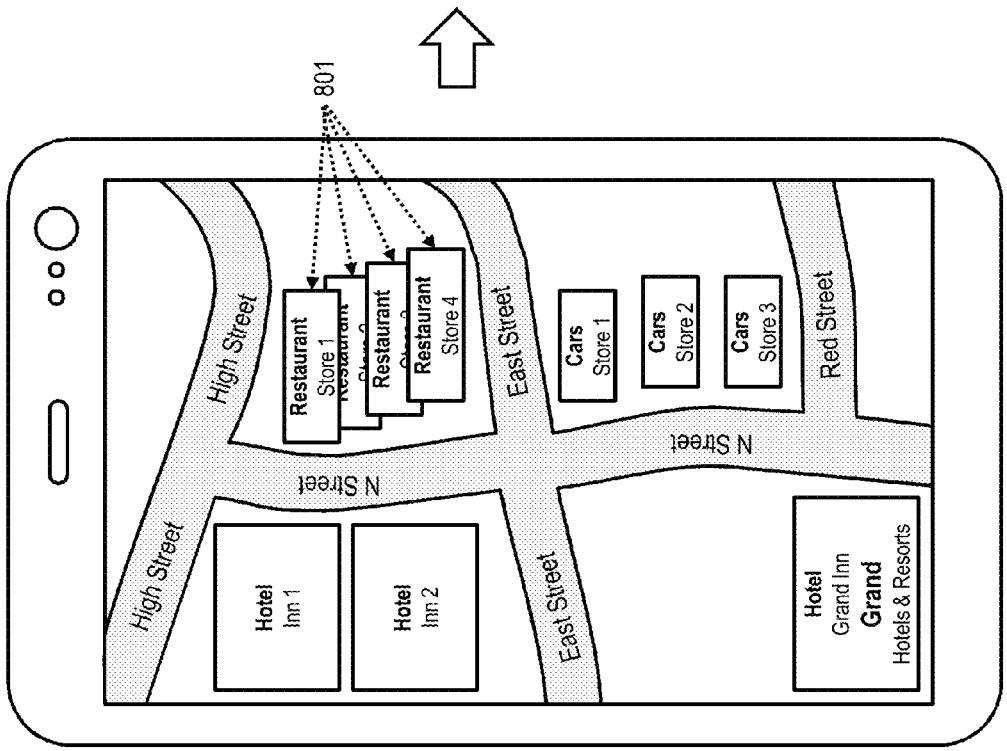

FIGS. 8A and 8B are, respectively, diagrams of a user interface associated with conventional mapping, and a user interface utilized in the processes of FIG. 3 according to one embodiment. As shown in FIG. 8A, the user interface 800 includes representations 801 which represent that "Restaurant: Store 1," "Restaurant: Store 2," "Restaurant: Store 3," and "Restaurant: Store 4" are located along one side of "N Street" and between "High Street" and "East Street." In FIG. 8B, the user interface 830 includes representations 831 and 833 which represent that "Restaurant: Store 1," "Restaurant: Store 2," "Restaurant: Store 3," and "Restaurant: Store 4" are along one side of "N Street" and between "High Street" and "East Street," and that "Fitness: Store 1" is along one side of "N Street" and in an area alongside "Red Street" opposite "East Street."

As illustrated, the user interface 830 provides several advantages over the user interface 800. For example, the user interface 830 reduces the cluttering associated with POI-dense areas. As shown in FIG. 8A, the representations 801 in the user interface 800 are clumped together, reducing the amount of information that is actually viewable to the user with respect to POIs associated with the representations 801. In addition, although "Fitness: Store 1" is located along "N Street" and in the area alongside "Red Street" opposite "East Street," there is no representation on the user interface 800 to indicate that "Fitness: Store 1" exists since "Fitness: Store 1" is actually located in a portion of the area that currently is not rendered. As demonstrated in FIG. 8B, the user interface 830 reduces the clutter associated with the POI-dense areas by increasing the length of "N Street" (as rendered) with respect to the block between "High Street" and "East Street" based on the density of the POIs. Moreover, the user interface 830 increases the information that is actually viewable to the user with respect to POIs by providing a rendered list of POIs (along with other map data items), reducing the rendering of "empty spaces" that provide little, if any, additional information. As such, the user interface 830 includes a representation for "Fitness: Store 1" (e.g., representation 833) where the user interface 800 does not include such representation.

The processes described herein for providing list-based exploration of mapping data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
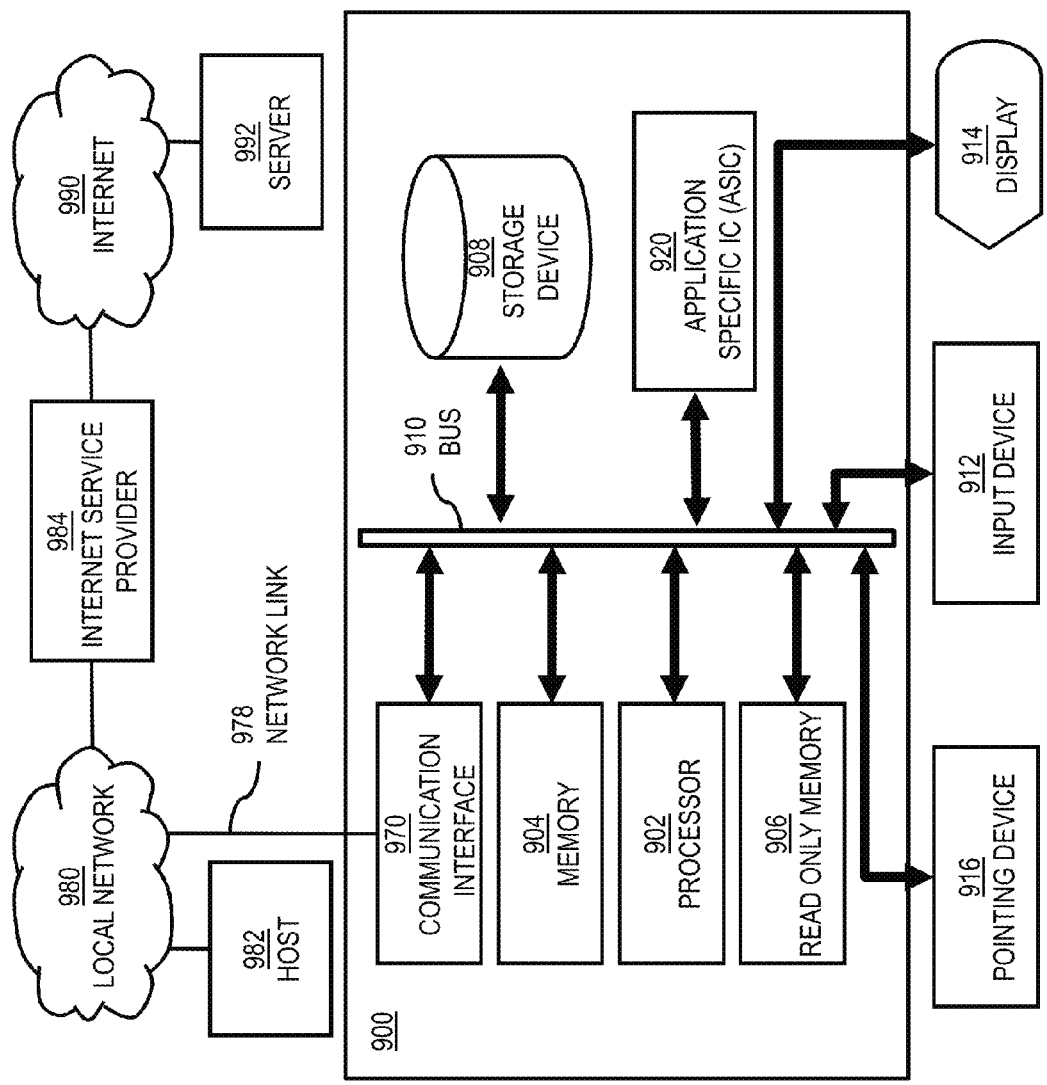
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide list-based exploration of mapping data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing list-based exploration of mapping data.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing list-based exploration of mapping data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing list-based exploration of mapping data. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing list-based exploration of mapping data, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing list-based exploration of mapping data to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide list-based exploration of mapping data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing list-based exploration of mapping data.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide list-based exploration of mapping data. The memory 1005 also stores the data associated with or generated by the execution of the inventive steps.

Figure 11:
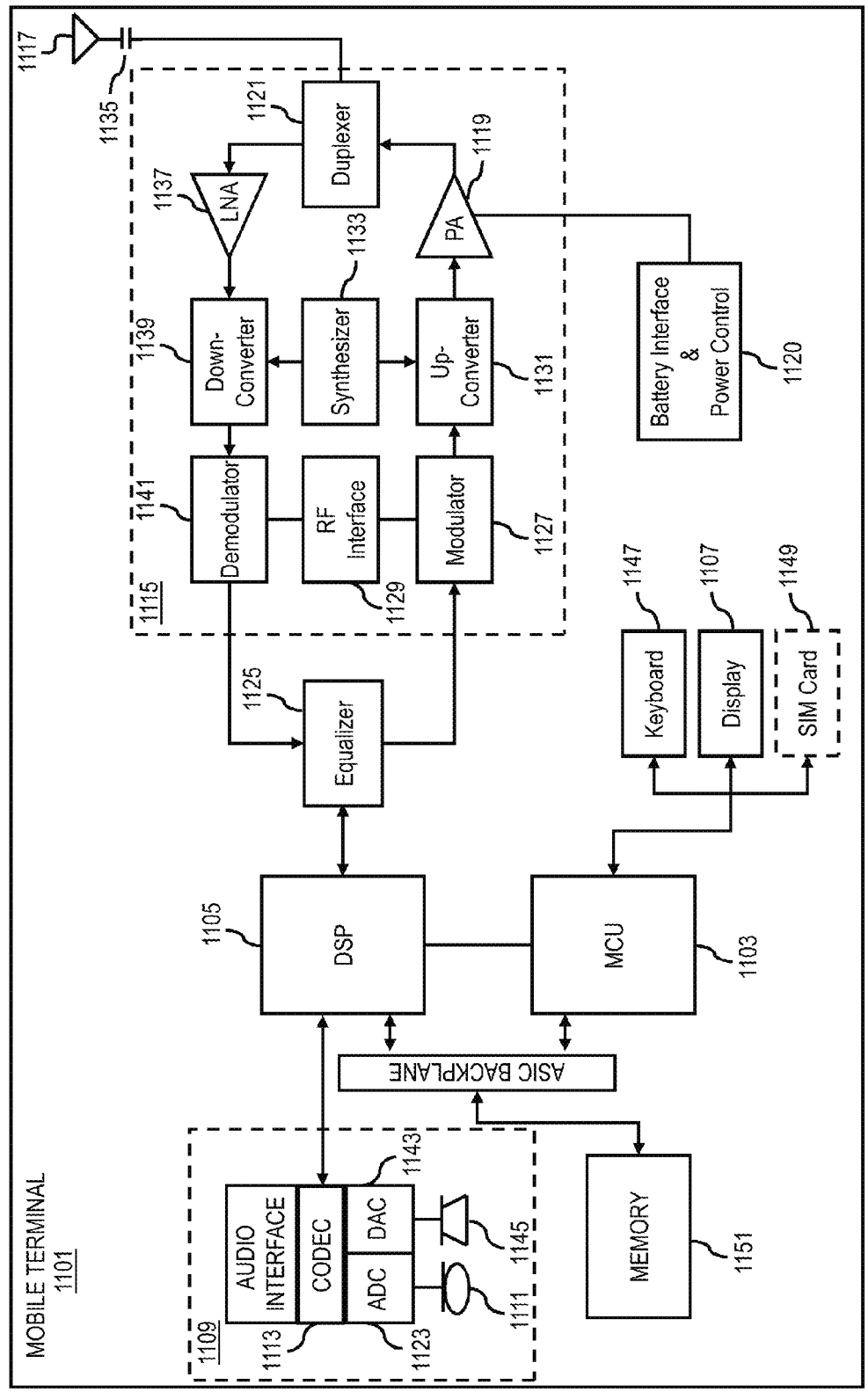
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing list-based exploration of mapping data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing list-based exploration of mapping data. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide list-based exploration of mapping data. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   an association of one or more features of a geographical area with one or more list objects;
   a processing of location information associated with one or more map data items to group, to sort, or a combination thereof the one or more map data items into the one or more list objects; and
   a rendering of at least one of the one or more list objects as a representation of a map in a user interface,
   wherein the user interface includes one or more user interface elements for controlling a browsing of the one or more map data items in the at least one of the one or more list objects.

2. A method of claim 1, wherein the (1) data and/or (2) information and/or (3) at least one signal are further based, at least in part, on the following:
   a processing of semantic information associated with the one or more features, the one or more map data items, or a combination thereof,
   wherein the rendering of the at least one of the one or more list objects is based, at least in part, on the semantic information.

3. A method of claim 1, wherein the (1) data and/or (2) information and/or (3) at least one signal are further based, at least in part, on the following:
   at least one determination of one or more subsets of the at least one or more list objects for rendering based, at least in part, on the grouping, the sorting, or a combination thereof,
   wherein the rendering of the at least one of the one or more list objects is based, at least in part, on the one of more subsets.

4. A method of claim 3, wherein the one or more subsets are further based, at least in part, on context information, preference information, or a combination thereof associated with a user.

5. A method of claim 1, wherein the (1) data and/or (2) information and/or (3) at least one signal are further based, at least in part, on the following:
   at least one determination of an activation of at least one of the one or more user interface elements; and
   a rendering of one or more other subsets of the at least one of the one or more list objects based, at least in part, on the activation.

6. A method of claim 1, wherein the (1) data and/or (2) information and/or (3) at least one signal are further based, at least in part, on the following:
   at least one determination of a selection of at least one of the one or more map data items in the at least one of the one or more list objects; and
   a rendering of at least another one of the one or more list objects based, at least in part, on the selection.

7. A method of claim 6, wherein (a) the at least one of the one or more list objects corresponds with at least one of the one or more features, (b) the at least another one of the one or more list objects and the at least one of the one or more map data items corresponds with at least another one of the one or more features, and (c) the at least one of the one or more features intersects with the at least another one of the one or more features.

8. A method of claim 1, wherein the (1) data and/or (2) information and/or (3) at least one signal are further based, at least in part, on the following:
   a rendering of the one or more features based, at least in part, on a density with respect to the one or more map data items.

9. A method of claim 1, wherein the (1) data and/or (2) information and/or (3) at least one signal are further based, at least in part, on the following:
   at least one determination of the at least one of the one or more list objects for rendering based, at least in part, on context information, preference information, or a combination thereof associated with a user.

10. A method of claim 1, wherein the (1) data and/or (2) information and/or (3) at least one signal are further based, at least in part, on the following:
    a processing of schematic information associated with the geographical area,
    wherein the grouping, the sorting, or a combination thereof is based, at least in part, on the schematic information.

11. An apparatus comprising:
    at least one processor; and
    at least one memory including computer program code for one or more programs,
    the at least one memory and the computer program code configured to, with the at least one processor, cause the apparatus to perform at least the following,
    cause, at least in part, an association of one or more features of a geographical area with one or more list objects;
    process and/or facilitate a processing of location information associated with one or more map data items of a first map to group, to sort, or a combination thereof the one or more map data items into the one or more list objects; and
    cause, at least in part, a rendering of at least one of the one or more list objects as a representation of a second map in a user interface, the second map based on the one or more list objects appearing different than the first map based on the one or more map data items,
    wherein the user interface includes one or more user interface elements for controlling a browsing of the one or more map data items in the at least one of the one or more list objects.

12. An apparatus of claim 11, wherein the apparatus is further caused to:
    process and/or facilitate a processing of semantic information associated with the one or more features, the one or more map data items, or a combination thereof,
    wherein the rendering of the at least one of the one or more list objects is based, at least in part, on the semantic information.

13. An apparatus of claim 11, wherein the apparatus is further caused to:
    determine one or more subsets of the at least one or more list objects for rendering based, at least in part, on the grouping, the sorting, or a combination thereof,
    wherein the rendering of the at least one of the one or more list objects is based, at least in part, on the one of more subsets.

14. An apparatus of claim 13, wherein the one or more subsets are further based, at least in part, on context information, preference information, or a combination thereof associated with a user.

15. An apparatus of claim 11, wherein the apparatus is further caused to:
- determine an activation of at least one of the one or more user interface elements; and
- cause, at least in part, a rendering of one or more other subsets of the at least one of the one or more list objects based, at least in part, on the activation.

16. An apparatus of claim 11, wherein the apparatus is further caused to:
- determine a selection of at least one of the one or more map data items in the at least one of the one or more list objects; and
- cause, at least in part, a rendering of at least another one of the one or more list objects based, at least in part, on the selection.

17. An apparatus of claim 16, wherein (a) the at least one of the one or more list objects corresponds with at least one of the one or more features, (b) the at least another one of the one or more list objects and the at least one of the one or more map data items corresponds with at least another one of the one or more features, and (c) the at least one of the one or more features intersects with the at least another one of the one or more features.

18. An apparatus of claim 11, wherein the apparatus is further caused to:
- cause, at least in part, a rendering of the one or more features based, at least in part, on a density with respect to the one or more map data items.

19. An apparatus of claim 11, wherein the apparatus is further caused to:
- determine the at least one of the one or more list objects for rendering based, at least in part, on context information, preference information, or a combination thereof associated with a user.

20. An apparatus of claim 11, wherein the apparatus is further caused to:
- process and/or facilitate a processing of schematic information associated with the geographical area,
- wherein the grouping, the sorting, or a combination thereof is based, at least in part, on the schematic information.

* * * * *